(12) United States Patent
Guenther et al.

(10) Patent No.: US 7,730,076 B2
(45) Date of Patent: Jun. 1, 2010

(54) TECHNIQUE FOR AUTO FILLING VALUES IN A USER INTERFACE

(75) Inventors: Martin Guenther, Karlsdorf-Neuthard (DE); Christoph Kernke, Einhausen (DE); Oswald Wieser, Schwetzingen (DE)

(73) Assignee: SAP AG, Walldorf (DE)

( * ) Notice: Subject to any disclaimer, the term of this patent is extended or adjusted under 35 U.S.C. 154(b) by 417 days.

(21) Appl. No.: 11/733,785

(22) Filed: Apr. 11, 2007

(65) Prior Publication Data

US 2008/0256022 A1    Oct. 16, 2008

(51) Int. Cl.
*G06F 7/00* (2006.01)

(52) U.S. Cl. ................... 707/750; 707/758; 707/752; 707/999.006

(58) Field of Classification Search ................ 707/1, 707/3, 5, 7, 110, 100, 102, 104.1, 200, 758, 707/780; 715/744
See application file for complete search history.

(56) References Cited

U.S. PATENT DOCUMENTS

| | | | |
|---|---|---|---|
| 4,956,774 A * | 9/1990 | Shibamiya et al. | 707/2 |
| 6,499,042 B1 * | 12/2002 | Markus | 715/217 |
| 7,343,551 B1 * | 3/2008 | Bourdev | 715/209 |
| 2008/0133572 A1 * | 6/2008 | Verhey-Henke et al. | 707/102 |

\* cited by examiner

*Primary Examiner*—Miranda Le (57) ABSTRACT

Disclosed is a method and system to receive a first value of a first attribute in a user interface and create a value pattern for a second attribute in the user interface based on the first value dynamically. A second value for the second attribute is automatically proposed from the created value pattern.

16 Claims, 6 Drawing Sheets

| employee ID | name | surname | birth month |
|---|---|---|---|
| A003 | Spider | Man | Mar |
| A004 | Super | Man | Jan |
| A005 | Bat | Man | Jun |
| A006 | Hit | Man | Jun |
| A007 | James | Bond | Mar | employee_data 500

TECHNIQUE FOR AUTO FILLING VALUES IN A USER INTERFACE

FIELD OF THE INVENTION

The invention relates to auto filling values for fields in a user interface.

BACKGROUND OF THE INVENTION

Data entry operations in an application may be time consuming. Many software applications may have a data entry user interface (UI) for creating a new record such as details of a person, product and service. A part of the data entered may often be same as the data entered previously. Consider a UI in an application which creates a record of an employee having details such as name of the employee, employee identification number, name of a team the employee may be working in, and name of a manager of the team. For example, when records for a number of employees working in the team have to be created, the records may be created one by one. A part of the data such as name of the team and name of the manager may be same for all employees working in the team. Though the name of the team and name of the manager may be same they may have to be entered for all the employees working in the team. This may be inefficient as the data may be entered for all the employees manually even though they are same. Thus, entering the same data repetitively may result in an unproductive usage of time and effort.

Also, often times when a user makes a data entry in few fields of the record in the UI, the data that must be entered in the rest of the fields of the record may be obvious to the user. But, the application may not know the data to be entered. Thus, the user may have to spend time and effort in entering the data though the data to be entered is obvious. This may result in unproductive usage of time and effort. For example, an application may have a UI to create a record of an employee working in an organization. The record may have details such as employee identification number, employee name, date of birth and age. After creating the record of an employee, the record may be stored in a database. The application may have another UI for creating a list of employees participating in a sports competition. The record may have details such as employee identification number, employee name, date of birth, age, and sports event. Once the sports event and the employee identification number is entered in the UI, the rest of the details such as employee name, date of birth and age of the employee are obvious as the application may already have the employee name, date of birth and age of the employee corresponding to the employee identification number entered, in the database. But the application may not know that the employee name, date of birth and age of the employee is obvious and may not fill the values for them automatically. Thus, the user may have to enter the employee name, date of birth and age again which may result in an unproductive usage of time and effort.

SUMMARY OF THE INVENTION

What is described is a method and system to receive a first value of a first attribute in a user interface and create a value pattern for a second attribute in the user interface based on the first value dynamically. A second value for the second attribute is automatically proposed from the created value pattern. The second value may be automatically filled with a proposed value from the value pattern whose frequency of occurrence is above a threshold frequency of the second attribute.

The value pattern is created by fetching the proposed value for the second attribute stored in a database. The value pattern includes the proposed value for the second attribute and the frequency of the occurrence of the proposed value fetched from the database. The value pattern may be displayed in the user interface.

DETAILED DESCRIPTION

A value pattern is created for an attribute in a user interface (UI) which proposes a value that may be filled for the attribute in the UI. A first value of a first attribute in the UI may be received and a value pattern for a second attribute in the UI is created based on the first value dynamically. A second value for the second attribute is automatically proposed from the created value pattern. The second value may be automatically filled with a proposed value from the value pattern whose frequency of occurrence may exceed a threshold frequency of the second attribute.

Figure 1:
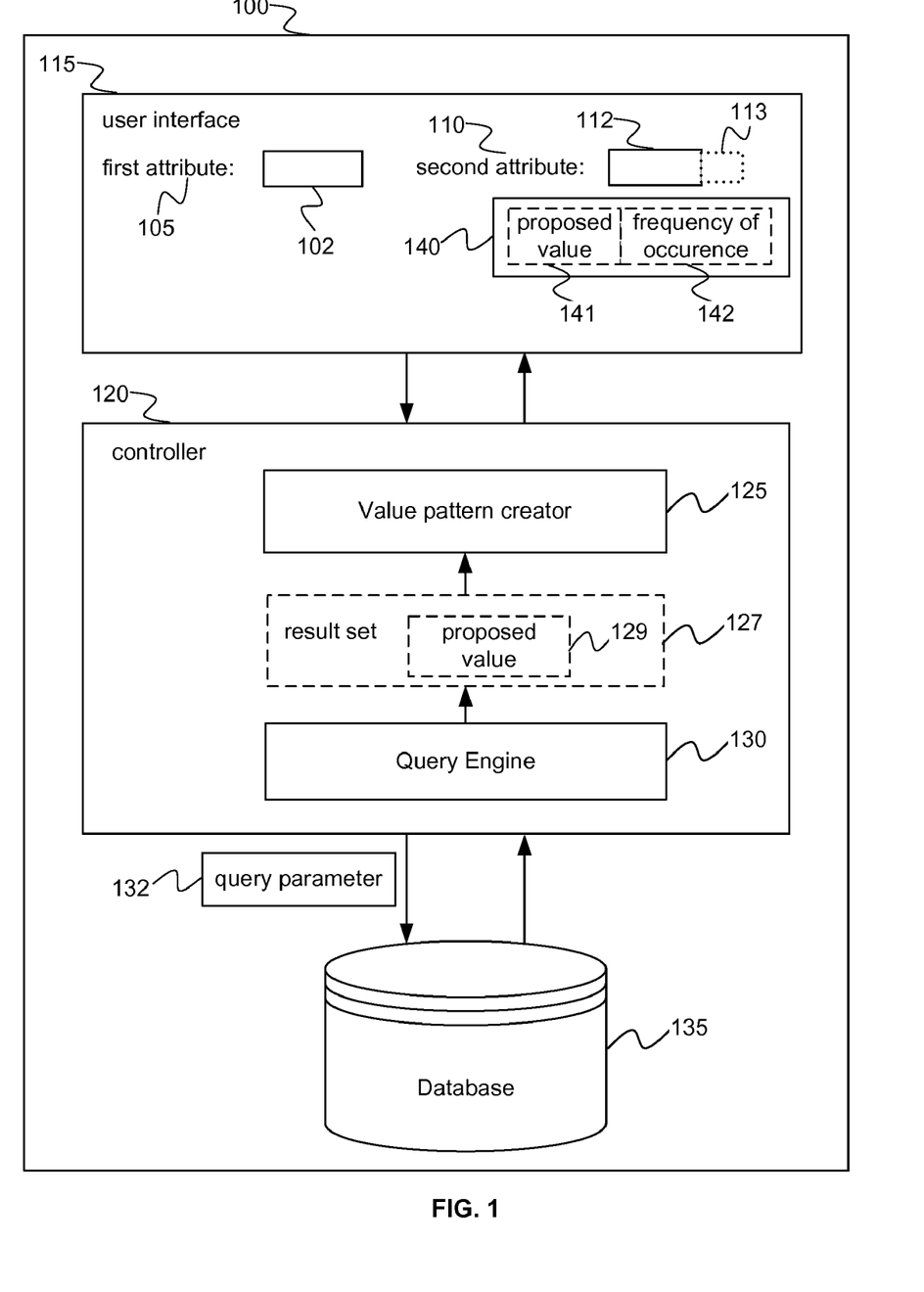
FIG. 1 is a block diagram of a system to propose a value for an attribute in a user interface according to an embodiment of the invention.

FIG. 1 is a block diagram of a system to propose a value for an attribute in a user interface according to an embodiment of the invention. System 100 includes user interface 115, a controller 120 and a database 135. User interface 115 has a first attribute 105 and a second attribute 110. Controller 120 creates a value pattern 140 and database 135 stores values of first attribute 105 and second attribute 110. Controller 420 includes a query engine 430 that queries database 435 to fetch a proposed value from database 135 based on a query parameter 132 into a result set 127. Controller 120 includes a value pattern creator 125 that creates value pattern 140 based on the result set 127 fetched by the query engine 130. Database 135 also stores properties of first attribute 105 and second attribute 110 that include threshold frequency, font, color, width, and length. User interface 115 receives first value 102 for first attribute 105 and proposes a second value 112 to second attribute 110 by creating a value pattern 140. Value pattern 140 includes a proposed value 141 for second attribute 110. The second value 112 for second attribute 110 may be filled with the proposed value 141 from value pattern 140.

User interface 115 receives a first value 102 for the first attribute 105 and passes first value 102 to controller 120. Query engine 130 in controller 120 queries database 135 with first value 102 as a query parameter 132 and fetches a proposed value 129 for second attribute 110 from database 135 into a result set 127. Value pattern creator 125 creates value pattern 140 for second attribute 110 by including a proposed value 129 from result set 127. Value pattern 140 includes proposed value 141 for second value 112 from result set 127 and a frequency of occurrence 142 of the proposed value 141 in result set 127. User interface 115 proposes a second value 112 for second attribute 110 by displaying value pattern 140. Second value 112 in the UI may be filled with the proposed value 141 from value pattern 140 automatically if the frequency of occurrence 142 of the proposed value 141 is above a threshold frequency 113 of second attribute 110. The threshold frequency 113 for an attribute in user interface 115 may be configured by a user. In another embodiment, the threshold frequency 113 may be set to a default value by an application having user interface 115. The user may also select the proposed value 141 from the value pattern 140. Value pattern 140 may be displayed in user interface 115 in ascending and descending order of the frequency of occurrence 142 of the proposed value 141. In an embodiment, value pattern 140 and threshold frequency 113 for second attribute 110 may be displayed as a pop-up in user interface 115.

Size of value pattern 140, that is, number of values that may be displayed in value pattern 140 may be based upon database strength. Database strength is determined as a product of number of columns and number of rows in a database table that represents an attribute in user interface 115. It will be clear to one skilled in the art that database 135 may be based on different database models such as relational model, hierarchical model, network model, object model and object relational model.

Figure 2:
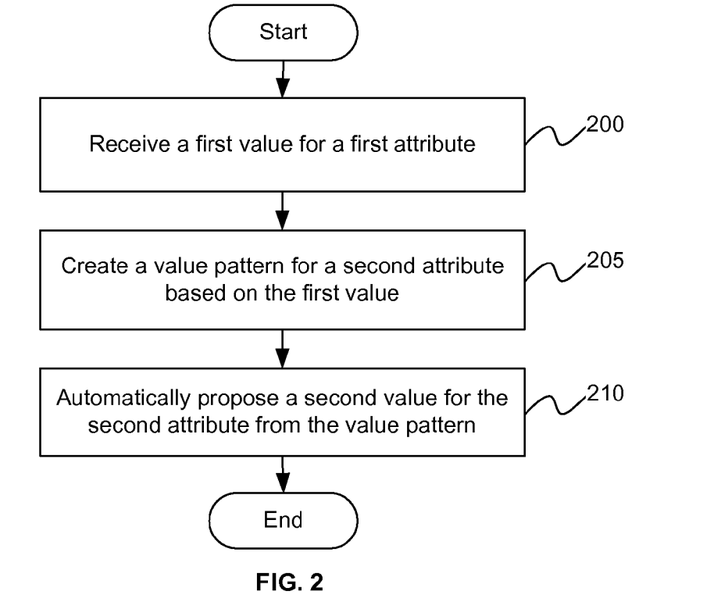
FIG. 2 is a flow diagram for proposing a value for an attribute in a user interface according to an embodiment of the invention.

FIG. 2 is a flow diagram for proposing a value for an attribute in a user interface according to an embodiment of the invention. A first value for a first attribute is received in UI at 200. A value pattern is created for a second attribute based on the first value for first attribute as depicted by 205. The value pattern includes a proposed value for the second attribute and the frequency of occurrence of the proposed value. A second value is automatically proposed for the second attribute from the value pattern as depicted by 210.

Figure 3:
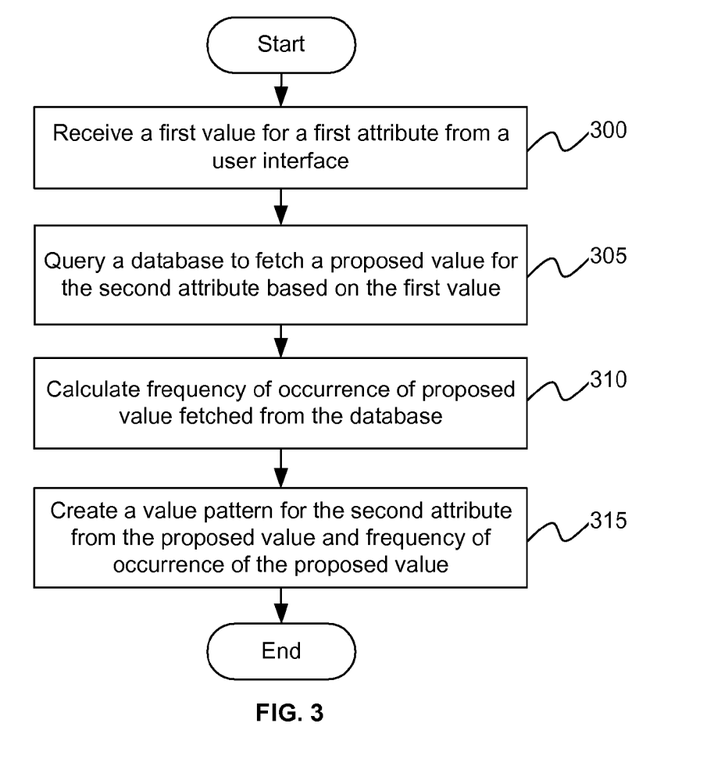
FIG. 3 is a flow diagram for creating a value pattern for an attribute in a user interface according to an embodiment of the invention.

FIG. 3 is a flow diagram for creating a value pattern for an attribute in a user interface according to an embodiment of the invention. A first value for a first attribute is received from the UI at 300. A query is executed on a database with the first value as a query parameter to fetch a proposed value for a second attribute as depicted by 305. The frequency of occurrence of the proposed value fetched from the database is calculated at 310. A value pattern is created for the second attribute based on the first value for the first attribute by including the proposed value fetched from the database and the frequency of occurrence of the proposed value as depicted by 315.

Figure 4:
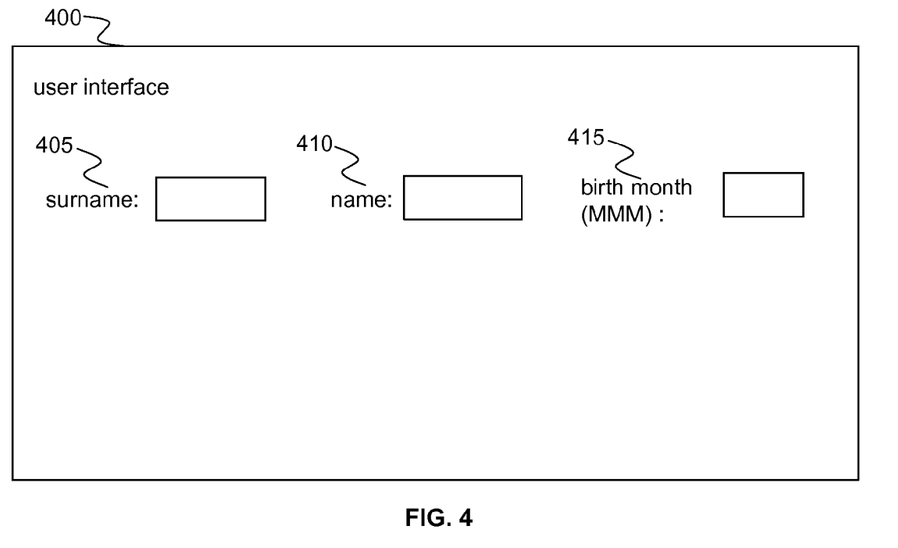
FIG. 4 is a block diagram of a user interface in an application for registering an employee for a sports event in an organization according to an embodiment of the invention.

FIG. 4 is a block diagram of a user interface in an application for registering an employee for a sports event in an organization according to an embodiment of the invention. UI 400 includes attributes surname 405, name 410, and birth month 415. The employee may be registered for the sports event by entering the employee details for the attributes surname 405, name 410, and birth month 415. In an embodiment, the user interface automatically registers an employee by storing the employee details in a database after all employee details are entered. A user may enter a value for the attributes surname 405, name 410, and birth month 415 corresponding to the employee being registered.

Figure 5:
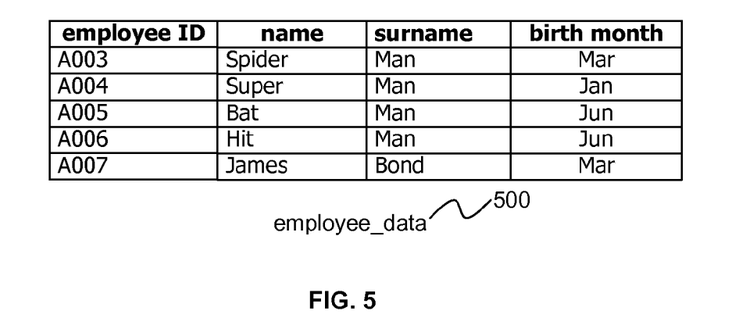
FIG. 5 illustrates a table in a database having details of employees working in an organization according to an embodiment of the invention.

FIG. 5 illustrates a table in a database having details of employees working in an organization according to an embodiment of the invention. Table, employee_data 500 includes details such as employee ID, name, surname and birth month of an employee working in the organization. Database strength of table employee_data 500 may be calculated as a product of number columns and number of rows which is 4*5=20. Thus, a value pattern for an attribute from table employee_data 500 may contain up to 20 proposed values of the attribute. In another embodiment, the details of employees may be stored in more than one table in which case the details of the employees may be fetched from more than one table. It will be clear to one skilled in the art that employee details such as employee ID, name, surname and birth month may be stored in various storage medium such as memory, files.

Figure 6:
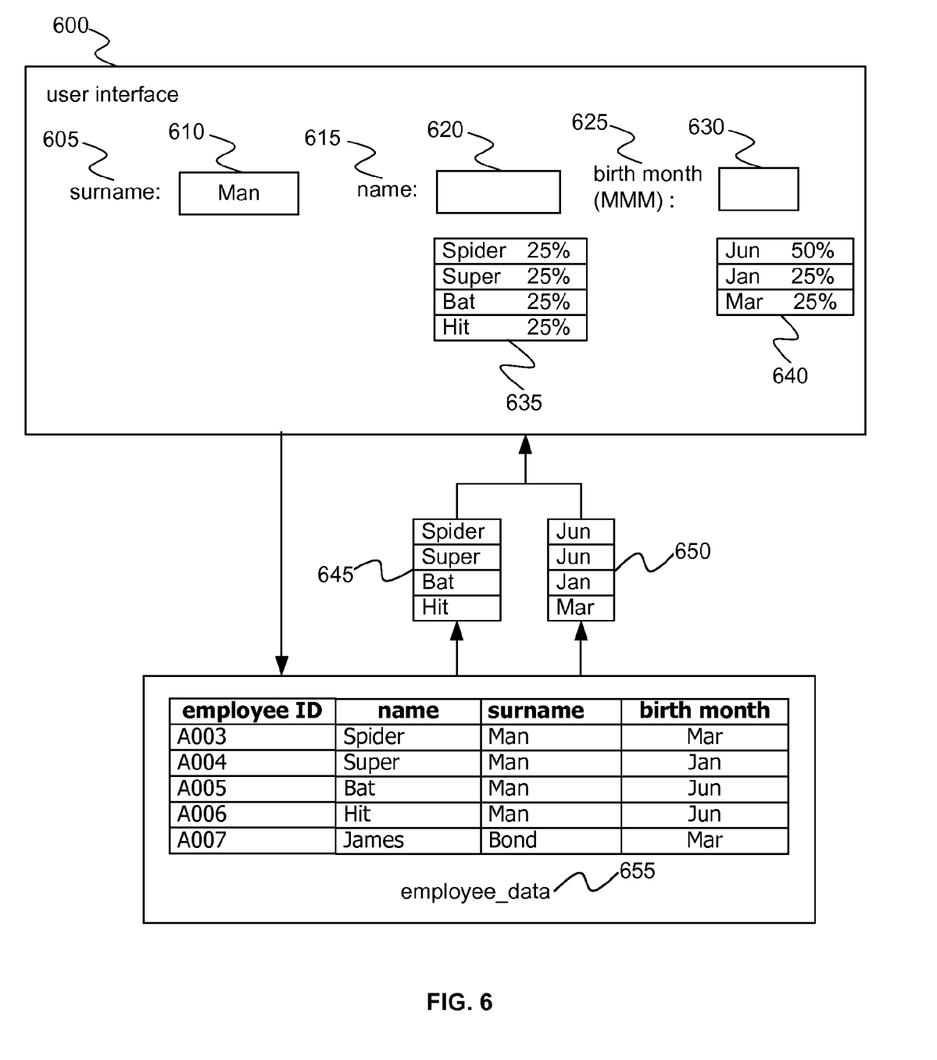
FIG. 6 is a block diagram of FIG. 4 for a user interface to propose a second value for a second attribute and a third value for a third attribute in the user interface based on a first value dynamically according to an embodiment of the invention.

FIG. 6 is a block diagram of FIG. 4 for a user interface to propose a second value for a second attribute and a third value for a third attribute in the UI based on a first value for first attribute dynamically according to an embodiment of the invention. As an example, user enters a first value 610 "Man" for first attribute surname 605. The user interface 600 automatically proposes a second value 620 for second attribute, name 615 by creating a name value pattern 635 and proposes a third value 630 for third attribute, birth month 625 by creating a birth month value pattern 640.

After the user enters first value 610 "Man" for surname 605, a query is executed on a table employee_data 655 to fetch a value of name from table employee_data 655 which has surname as first value 610 "Man". The query returns a result set 645 that contains a proposed value for name 615 that has first value 610 "Man" as surname in the table employee_data 655. The name in table employee_data 655 that has surname as first value 610 "Man" include Spider, Super, Bat, and Hit. Thus, the result set 645 may include proposed values "Spider, Super, Bat, Hit" for name 615. A frequency of occurrence of the proposed value in result set 645 may be calculated. The frequency of occurrence of the proposed value signifies the number of times the proposed value has occurred in table employee_data 655 for first value 610. For example, if result set 645 has 4 proposed values "Spider, Super, Bat, Hit", then the frequency of occurrence of "Spider" in result set 645 is 1 which means that name "Spider" has occurred 1 time in table employee_data 655 for the surname with first value 610 "Man". Similarly, the frequency of occurrence of "Super" is 1, the frequency of occurrence of "Bat" is 1, and the frequency of occurrence of "Hit" is 1. The frequency of occurrence of the proposed value may be displayed as a percentage frequency in user interface 600. Thus, the percentage frequency of "Spider" which occurs 1 out of 4 times in result set 645 may be calculated as 25%. Similarly the percentage frequency of "Super, Bat, Hit" which occur 1 out of 4 times in result set 645 may be calculated as 25%. A name value pattern 635 is created by including a proposed value for name 615 from result set 645 and percentage frequency of the proposed value. Thus, name value pattern 635 may include "Spider 25%, Super 25%, Bat 25%, Hit 25%". A second value 620 for second attribute, name 615 may be proposed from name value pattern 635 by displaying name value pattern 635 in user interface 600.

The second value 620 may be filled in three ways. In the first way, second value 620 may be automatically filled with a proposed value from name value pattern 635 if the percentage frequency of the proposed value in name value pattern 635 exceeds a threshold frequency of name 615. Since all proposed values in name value pattern 635 have same percentage frequency, second value 620 may not be filled automatically. In the second way, the user may fill second value 620 by choosing the proposed value from name value pattern 635 instead of entering the second value 620 manually thereby minimizing time and effort for making data entries in user interface 600. In the third way, the user may fill second value 620 with a new value manually that may not be in name value pattern 635.

Similar to name value pattern 635 created for second attribute, name 615, a birth month value pattern 640 is created for third attribute, birth month 625. The third value 630 may be filled with a proposed value from birth month value pattern 640. After the user enters first value 610, a query is executed on table employee_data 655 to fetch a value of birth month in table employee_data 655 which has the surname as first value 640 "Man". The query returns a result set 650 containing a proposed value of the birth month 625 that has first value 610 "Man" in table employee_data 655. The birth month in table employee_data 655 that has surname as first value 610 "Man" include "Jun, Jun, Jan, Mar". Thus, the result set 650 may include proposed values "Jun, Jun, Jan, Mar". The percentage frequency of the proposed values in result set 650 may be calculated. The percentage frequency of "Jun" which occurs 2 out of 4 times in result set 650 may be calculated as 50%. Similarly, the percentage frequency of "Jan" and "Mar" may be calculated as 25% each. The birth month value pattern 640 is created by including a proposed value for birth month 625 from result set 650 and percentage frequency of the proposed value. Thus, birth month value pattern 640 may include "Jun 50%, Jan 25%, Mar 25%". A third value 630 for third attribute, birth month 625 may be proposed from birth month value pattern 640 by displaying birth month value pattern 640 in user interface 600. In an embodiment, name value pattern 635 and birth month value pattern 640 may be displayed simultaneously in user interface 600. In another embodiment, name value pattern 635 may be displayed when the user moves a cursor of pointing device over name 615 and birth month value pattern 640 may be displayed when the user moves the cursor over birth month 625.

The third value 630 may be filled in three ways. In the first way, third value 630 may be filled automatically with a proposed value from birth month value pattern 640 if the percentage frequency of the proposed value in birth month value pattern 640 exceeds a threshold frequency of birth month 625. If the user has set the threshold frequency of birth month 625 to 45%, then third value 630 may be automatically filled with proposed value "Jun", since the percentage frequency of "Jun" which is 50%, exceeds the threshold frequency of 45% of birth month 625. Second way, the user may fill third value 630 by choosing the proposed value from birth month value pattern 640 instead of entering the third value 630 manually thereby minimizing time and effort for making data entries in user interface 600. Third way, the user may fill third value 630 by entering a new value manually that may not be in birth month value pattern 640.

Figure 7:
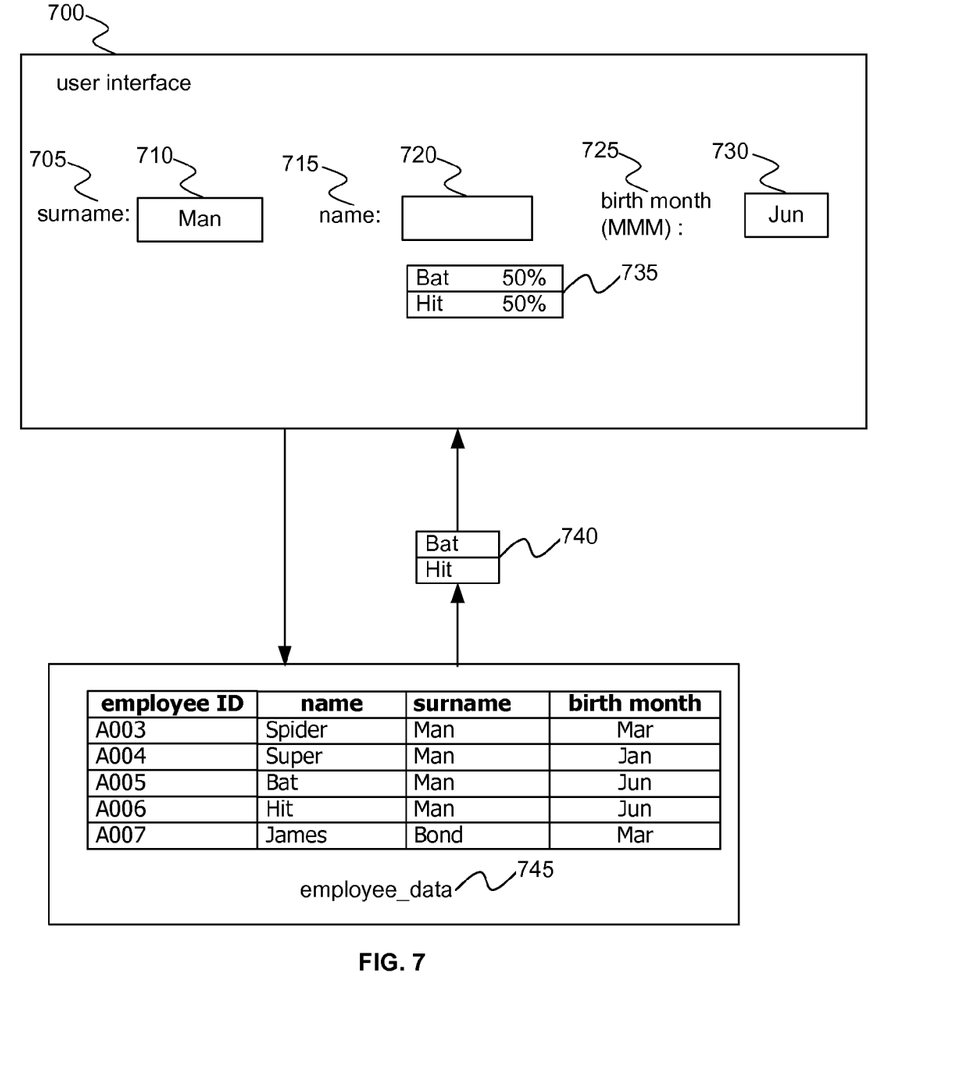
FIG. 7 is a block diagram of FIG. 6 for a user interface to update a value pattern for an attribute in the user interface dynamically according to an embodiment of the invention.

FIG. 7 is a block diagram of FIG. 6 for a UI to update a value pattern for an attribute in the user interface dynamically according to an embodiment of the invention. A user may choose to fill third value 730 from one of the three ways described in the FIG. 6. One way is third value 730 may be automatically filled with a proposed value "Jun" from birth month value pattern 640 since percentage frequency of "Jun" which is 50% exceeds the threshold frequency of 45% of birth month 625. After filling third value 730 with value "Jun"; name value pattern 635 is automatically updated to name value pattern 735 for second attribute, name 715. The name value pattern 735 may contain proposed values of name 715 that are more likely to be filled in second value 720 than proposed values from name value pattern 635. The name value pattern 735 may contain lesser or equal number of proposed values than number of proposed values in name value pattern 635. Thus, it may be easier for the user to choose a proposed value from name value pattern 735 than name value pattern 635 since name value pattern 735 may have lesser number of proposed values to choose from. First value 710 and third value 730 together form an input for creating name value pattern 735 for second attribute, name 715. The name value pattern 735 for name 715 may be created based on the input which is first value 710 "Man" and third value 730 "Jun".

A query is executed on table employee_data 745 to fetch a value of name that has surname and birth month as first value 710 "Man" and third value 730 "Jun" respectively in table employee_data 745. The values of name in table employee_data 745 that has surname and birth month as first value 710 "Man" and third value 730 "Jun" respectively include "Bat, Hit". Thus, the query returns a result set 740 including proposed values "Bat, Hit" for name 715. A percentage frequency of "Bat", and "Hit" may be calculated as 50% each. The name value pattern 735 may be created by including proposed values for name 715 from result set 740 and the percentage frequency of the proposed values. The name value pattern 735 may include proposed values "Bat 50%, Hit 50%". The name value pattern 735 may be displayed in user interface 700 and second value 720 for second attribute, name 715 may be filled with a proposed value from name value pattern 735.

The second value 720 may be filled in three ways. In the first way, second value 720 may be filled automatically with a value from name value pattern 735 if the percentage frequency of the proposed value exceeds a threshold frequency of name 715. In the second way, the user may fill second value 720 by choosing a proposed value from name value pattern 735 instead of entering the second value 720 manually thereby minimizing the time and effort for making data entries in user interface 700. Third way, the user may fill the second value 720 by entering a new value manually that may not be in name value pattern 735.

Figure 8:
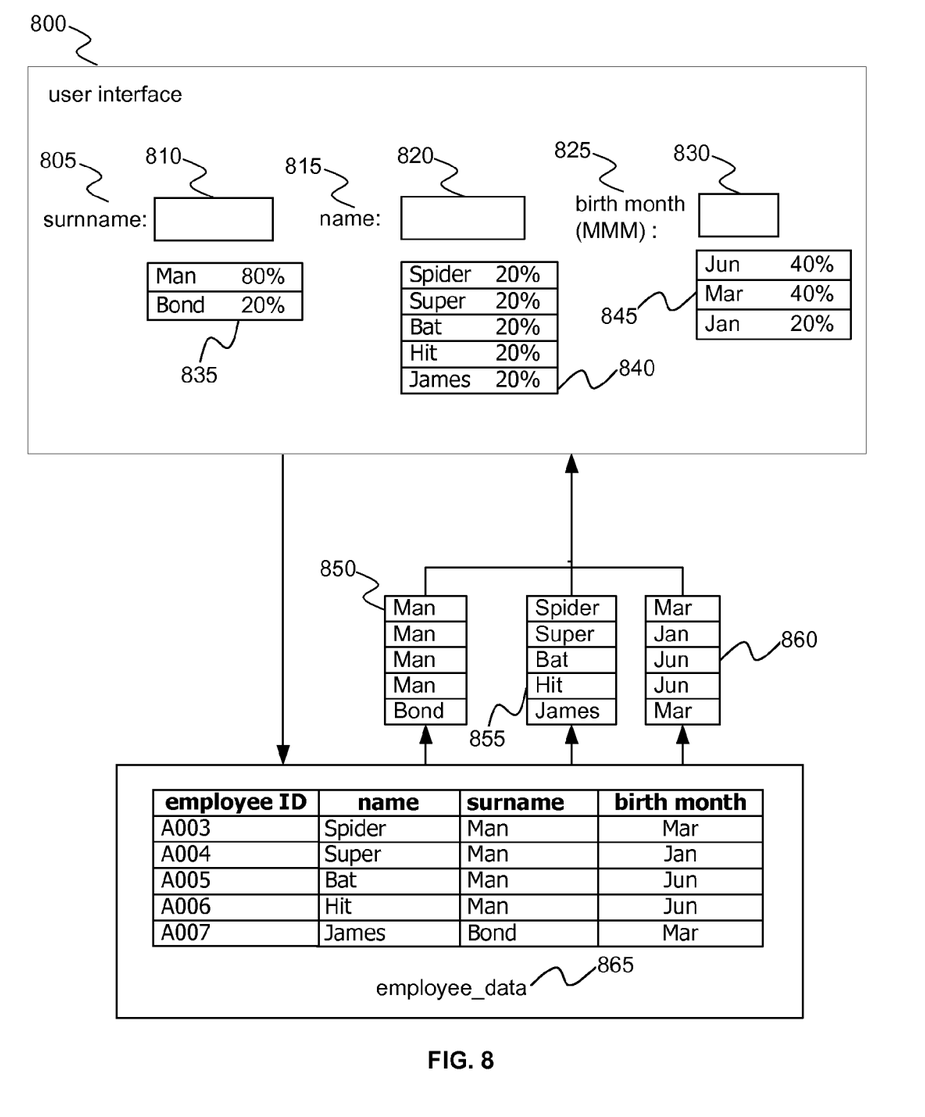
FIG. 8 is a block diagram of FIG. 4 for a user interface to propose a value for attributes in the user interface based on a null first value according to an embodiment of the invention.

FIG. 8 is a block diagram of FIG. 4 for a user interface to propose a value for attributes in the user interface based on a null first value according to an embodiment of the invention. A user interface 800 proposes a first value 810 for first attribute, surname 805 along with proposing a second value 820 for second attribute, name 815 and a third value 830 for third attribute, birth month 825 when first value 810 is null. In other words, user interface 800 may propose a value for all attributes in the UI when no value is input for any of the attributes, that is, when the first value 810, second value 820 and third value 830 is null. User interface 800 proposes a value for first attribute surname 805, a second attribute name 815 and a third attribute birth month 825 by creating a surname value pattern 835, name value pattern 840, and birth month value pattern 845 respectively based on null first value. The surname value pattern 835 may have all values of surname from table employee_data 865. Similarly, name value pattern 840 and birth month value pattern 845 may have all values of name and birth month respectively from table employee_data 865.

A query is executed on a table employee_data 865 to fetch all values of name, surname and birth month from table employee_data 865. The query returns a result set 850 for surname 805 based on the null first value that may include proposed values "Man, Man, Man, Bond". A percentage frequency of proposed values in result set 850 may be calculated. The surname value pattern 835 for surname 805 may be created by including a proposed value from result set 850 and percentage frequency of the proposed value. Thus, surname value pattern 835 may include "Man 80%, Bond 20%". A first value 810 for first attribute, surname 805 may be proposed from surname value pattern 835 by displaying the surname value pattern 835 in user interface 800.

Similarly, the query returns a result set 855 and a result set 860 for name 815 and birth month 825 respectively based on the null first value. The result set 855 may include proposed values "Spider, Super, Bat, Hit, James" for second attribute, name 815. The name value pattern 840 for name 815 may be created by including a proposed value for name 815 from result set 855 and percentage frequency of the proposed value. Thus, the name value pattern 840 for second attribute, name 815 may include proposed values "Spider 20%, Super 20%, Bat 20%, Hit 20%, James 20%". The result set 860 may include proposed values "Mar, Jan, Jun, Jun, Mar" for third attribute, birth month 825. The birth month value pattern 845 for birth month 825 may be created by including proposed value from result set 860 and percentage frequency of the proposed value. Thus, the birth month value pattern 845 may include proposed values "Jun 40%, Jan 20%, Mar 40%" for birth month 825. The name value pattern 840 and birth month value pattern 845 may be displayed in user interface 800. A second value 820 for second attribute, name 815 and a third value 830 for third attribute, birth month 825 may be proposed from name value pattern 840 and birth month value pattern 845 respectively.

The first value 810, second value 820 and third value 830 may be filled in three ways. In the first way, first value 810, second value 820 and third value 830 may be filled automatically with a proposed value from surname value pattern 835, name value pattern 840, and birth month value pattern 845 respectively if the percentage frequency of the proposed value exceeds a threshold frequency. In the second way, the user may fill first value 810, second value 820 and third value 830 by choosing a proposed value from surname value pattern 835, name value pattern 840, and birth month value pattern 845 respectively instead of entering the proposed value manually thereby minimizing the time and effort for making data entries in user interface 800. In the third way, the user may fill first value 810, second value 820 and third value 830 by entering a new value manually that may not be in surname value pattern 835, name value pattern 840, and birth month value pattern 845 respectively.

A significant amount of time and effort may be spent on making data entries in an application. Moreover, making same data entries repeatedly may result in an unproductive usage of the time and effort. Thus, there is a need for auto filling technique which involves proposing a value for an attribute in the UI and automatically filling the value minimizes the time and effort spent on making data entries. The auto filling technique may also enhance the usability of the UI and may improve the experience of the user with the UI.

Embodiments of the invention may include various steps as set forth above. The steps may be embodied in machine-executable program code which causes a general-purpose or special-purpose processor to perform certain steps. Alternatively, these steps may be performed by specific hardware components that contain hardwired logic for performing the steps, or by any combination of programmed computer components and custom hardware components.

Embodiments of the present invention may also be provided as a machine-readable medium for storing the machine-executable instructions. The machine-readable medium may include, but is not limited to, flash memory, optical disks, CD-ROMs, DVD ROMs, RAMs, EPROMs, EEPROMs, magnetic or optical cards, or any other type of machine-readable media suitable for storing electronic instructions. For example, the present invention may be downloaded as a computer program which may be transferred from a remote computer (e.g., a server) to a requesting computer (e.g., a client) by way of a communication link (e.g., a modem or network connection).

Although the preferred embodiments of the invention have been described and illustrated in detail, the described embodiments are to be considered in all respects only as illustrative and not restrictive. It will be apparent to those skilled in the art that various modifications and changes may be made thereto without departing from the spirit and scope of the invention as set forth in the appended claims and equivalents thereof.

What is claimed is:

1. A method for dynamically filling values in a user interface, the method comprising:
   receiving a first value for a first attribute to be displayed in a first portion of the user interface;
   based on the first value, querying a database for fetching two or more proposed values of a second attribute by calculating a frequency of occurrence of the proposed values in a database table associated with the first value, wherein the frequency of occurrence of the proposed values depends on a database strength, wherein the database strength is determined as a product of a number of columns and a number of rows in the database table storing the proposed values;
   generating a value pattern for the second attribute to be displayed in a second portion of the user interface, the value pattern comprising the proposed values of the second attribute determined based on the first value and the frequency of occurrence of the proposed values;
   displaying the value pattern of the second attribute based on the frequency of occurrence of the proposed values; and
   dynamically filling the second portion of the user interface with a second value for the second attribute selected from the proposed values that exceed a threshold frequency, wherein the threshold frequency is configurable.

2. The method in claim 1, wherein displaying the value pattern of the second attribute comprises displaying the value pattern for the second attribute in the second portion of the user interface.

3. The method of claim 2, wherein displaying the value pattern of the second attribute in the user interface comprises displaying the value pattern in a pop-up user interface.

4. The method in claim 1, wherein displaying the value pattern of the second attribute comprises sorting the value pattern according to frequency of occurrence of the proposed values.

5. The method in claim 1, wherein the first value comprises a null value.

6. The method in claim 5, wherein the first value comprising the null value initiates generating a value pattern for a first attribute.

7. The method of claim 1, wherein the threshold frequency is displayed in a pop-up user interface.

8. The method of claim 1, wherein the threshold frequency is set to a default value.

9. The method of claim 1, wherein the threshold frequency is set by a user.

10. A computer system, for dynamically filling values in a user interface, the computer system comprising:
- the user interface element operable to
  - receive a user entry of a first value for a first attribute; and
  - to display a value pattern comprising proposed values of the second attribute to be selected for entry into the user interface element, wherein the proposed values are determined at least in part based on the first value;
- a value pattern creator in a controller operable to
  - calculate a frequency of occurrence of the proposed values, wherein the number of values displayed in the value pattern depends on a database strength, wherein the database strength is determined as a product of number of columns and number of rows in a database table storing the proposed values; and
  - dynamically generate the value pattern comprising proposed values for the second attribute determined based on the first value and a frequency of occurrence of the proposed values, wherein the user interface automatically fills the second attribute with the proposed values from the value pattern having a frequency of occurrence above a threshold frequency, wherein the threshold frequency is configurable;
- a query engine in the controller operable for querying the database to fetch the proposed values of the second attribute based on the first value of the first attribute; and
- one or more database devices storing the proposed values of the second attribute.

11. The computer system in claim 10, wherein the one or more database devices store the first value of the first attribute.

12. The computer system in claim 10, wherein the user interface communicates data with the controller and the database over a communication network.

13. An article of manufacture, comprising:
- a machine readable medium comprising instructions, which when executed by a machine cause the machine to perform operations comprising:
  - receiving a first value for a first attribute to be displayed in a first portion of the user interface;
  - based on the first value, querying a database for fetching one or more proposed value of a second attribute by calculating a frequency of occurrence of the proposed values in a database table associated with the first value, wherein the frequency of occurrence of the proposed values depends on a database strength, wherein the database strength is determined as a product of a number of columns and a number of rows in the database table storing the proposed values;
  - generating a value pattern for the second attribute to be displayed in a second portion of the user interface, the value pattern comprising the proposed values of the second attribute determined based on the first value and the frequency of occurrence of the proposed values;
  - displaying the value pattern of the second attribute based on the frequency of occurrence of the proposed values; and
  - dynamically filling the second portion of the user interface with a second value for the second attribute selected from the proposed values that exceed a threshold frequency, wherein the threshold frequency is configurable.

14. The article of manufacture in claim 13, wherein generating the value pattern comprises fetching the proposed values of the second attribute stored in a database based on the first value.

15. The article of manufacture in claim 13, wherein displaying the value pattern of the second attribute comprises displaying the value pattern for the second attribute in the second portion of the user interface.

16. The article of manufacture in claim 13, wherein displaying the value pattern of the second attribute comprises sorting the value pattern according to frequency of occurrence of the proposed values.

\* \* \* \* \*